United States Patent
Ono

(10) Patent No.: US 7,411,178 B2
(45) Date of Patent: Aug. 12, 2008

(54) WAVELENGTH MEASURING DEVICE FOR A SINGLE LIGHT RECEIVING ELEMENT AND WAVELENGTH MEASURING METHOD AT DIFFERENT TEMPERATURES

(75) Inventor: Haruyoshi Ono, Yamanashi (JP)

(73) Assignee: Eudyna Devices Inc., Yamanashi (JP)

( * ) Notice: Subject to any disclaimer, the term of this patent is extended or adjusted under 35 U.S.C. 154(b) by 48 days.

(21) Appl. No.: 10/913,541

(22) Filed: Aug. 9, 2004

(65) Prior Publication Data

US 2005/0035272 A1    Feb. 17, 2005

(30) Foreign Application Priority Data

Aug. 11, 2003    (JP)    ............... 2003-207222

(51) Int. Cl.
  *H01J 7/24*    (2006.01)
  *G01J 3/46*    (2006.01)
(52) U.S. Cl. ...................... 250/238; 356/425
(58) Field of Classification Search ............. 250/238, 250/226; 356/425
  See application file for complete search history.

(56) References Cited

U.S. PATENT DOCUMENTS

| 4,189,235 A | * | 2/1980 | Guter et al. | ............... 356/239.1 |
| 5,266,792 A | * | 11/1993 | Crowne et al. | .......... 250/214 C |
| 2005/0018184 A1 | * | 1/2005 | Imura | ........................ 356/300 |

FOREIGN PATENT DOCUMENTS

| JP | 2-1995 | 1/1990 |
| JP | 6-58817 | 3/1994 |
| JP | 6-76830 | 10/1994 |
| JP | 2002-340688 | 11/2002 |

* cited by examiner

*Primary Examiner*—Thanh X Luu
(74) *Attorney, Agent, or Firm*—Westerman, Hattori, Daniels & Adrian, LLP.

(57) ABSTRACT

A wavelength measuring device includes: a light receiving element that receive light to be measured; a temperature controller that maintains the light receiving element at different temperatures; and a calculation unit that determines the wavelength of the light to be measured, based on the outputs of the light receiving elements.

6 Claims, 14 Drawing Sheets

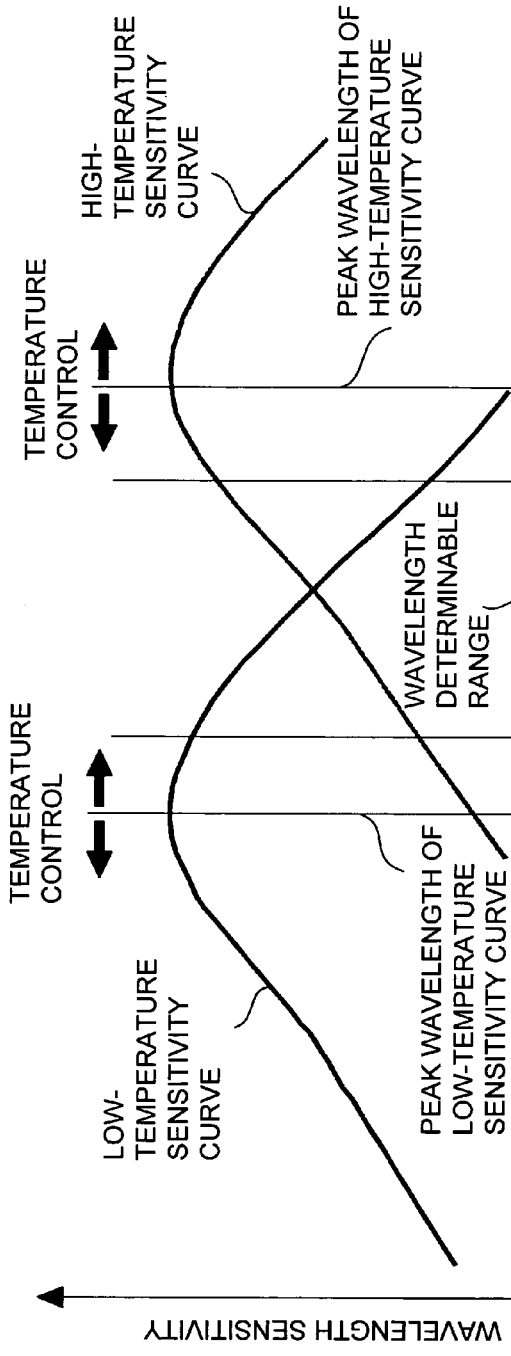
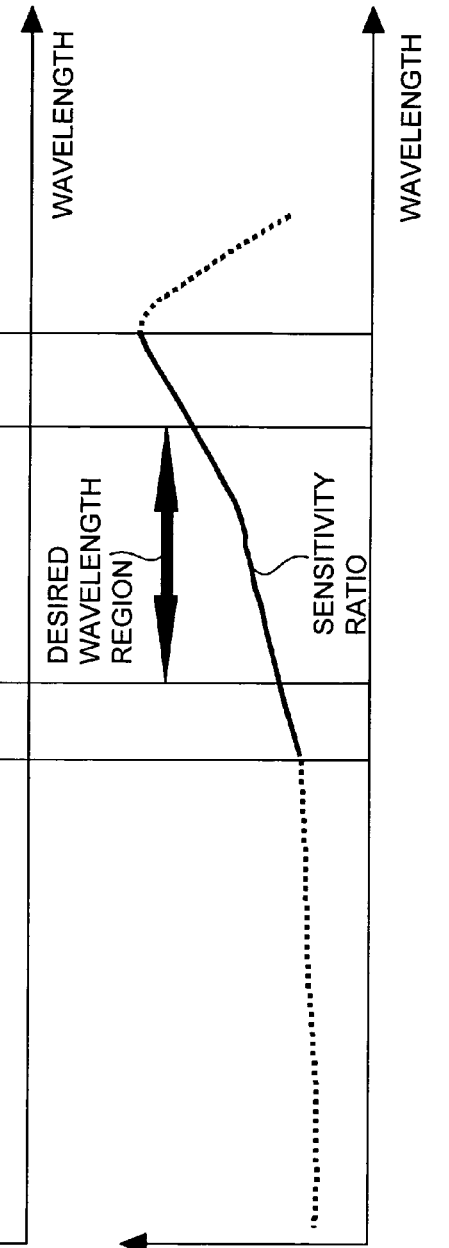
Fig. 8A
Fig. 8B

WAVELENGTH MEASURING DEVICE FOR A SINGLE LIGHT RECEIVING ELEMENT AND WAVELENGTH MEASURING METHOD AT DIFFERENT TEMPERATURES

BACKGROUND OF THE INVENTION

1. Field of the Invention

The present invention generally relates to wavelength measuring devices, light receiving units, and wavelength measuring methods, and more particularly, to a wavelength measuring device, a light receiving unit, and a wavelength measuring method that can be suitably used in the following fields: the optical communication field in which semiconductor laser diodes and semiconductor LEDs (Light Emitting Diodes) are used; the fields of processing industries using gas lasers, YAG lasers, and medical lasers; the field of optical pickup technology in which writing and reading are performed on general recording media such as DVDs (Digital Versatile Disks) and CDs (Compact Disks); and the fields of general consumer product industries involving infrared rays or the like.

2. Description of the Related Art

In the field of optical communications using semiconductor laser diodes and semiconductor LEDs (Light Emitting Diodes), involving WDM (Wavelength Division Multiplexing) in particular, the communication wavelength region is becoming more overcrowded, as the allowed space is becoming smaller. In this trend, there is a need to develop a high-precision wavelength control technique. Also, in the processing industries utilizing gas lasers, YAG lasers, and medical lasers, high-precision wavelength control is required, as the developments in nanotechnology such as micromachining are becoming more and more active. Further, in the field of optical pickup technology for performing reading and writing on general recording media such as DVDs and CDs, the wavelengths in the visible region are rapidly becoming shorter, as higher-density recording media are being more widely used. In the future, higher-precision wavelength control will be strongly required for the use of multi-wavelength pickup LDs or mixed recording density devices that can perform reading and writing on next-generation recording media. Also, the infrared control technique used in remote controllers has been applied to various fields, and there is an increasing demand for a wavelength control technique that can be used in multi-channel or multimedia remote control.

So as to realize a high-precision wavelength control operation in the above described fields, it is necessary to accurately determine the oscillation wavelength from each light source. As a conventional oscillation wavelength determining technique, Japanese Laid-Open Patent Application Publication No. 2002-340688 (hereinafter referred to as Document 1) discloses the following technique. As shown in FIG. 1, the structure disclosed in Document 1 has photoelectric converter layers 101 and 102 provided in two locations on the light path. The photoelectric converter layers 101 and 102 have different sensitivity characteristics from each other. Based on the ratio between the photoelectric conversion currents outputted from the photoelectric converter layers 101 and 102 (the ratio corresponding to the "sensitivity ratio" in the following), the wavelength is determined.

In the above structure, light receiving elements PD_A and PD_B having different peaks in wavelength sensitivity (the wavelength sensitivities at wavelengths $\lambda$_A and $\lambda$_B: hereinafter referred to as the "peak wavelengths") are combined, so that a preferable sensitivity ratio can be obtained in the region between the wavelengths $\lambda$_A and $\lambda$_B (a wavelength determinable range F), as shown in FIG. 2. Thus, the wavelength can be accurately determined. FIG. 2 is a graph showing the wavelength determinable range F in the case where the light receiving elements PD_A and PD_B with ideally different sensitivity characteristics are combined. The light receiving elements PD_A and PD_B are equivalent to the photoelectric converter layers 101 and 102, and will be hereinafter also referred to as the light receiving elements PD.

By the technique disclosed in Document 1, however, two or more light receiving elements PD are combined, and accordingly, the wavelength determinable range is restricted by the physical characteristics of each light receiving element PD. For example, if the peak wavelengths in the sensitivity characteristics are almost the same, the wavelength determinable range F becomes very narrow, as shown in FIG. 3. If the peak wavelengths in the sensitivity characteristics are wide apart from each other, the wavelength sensitivity of one of the light receiving elements PD cannot be sufficiently obtained at the peak wavelength of the wavelength sensitivity of the other one of the light receiving elements PD, as shown in FIG. 4. In the case shown in FIG. 4, the ratio of the two photoelectric conversion currents cannot be accurately calculated. In another case where the combination of the light receiving elements PD_A and PD_B is not preferable, the wavelength determinable range F does not cover a desired wavelength determinable range F' at all, as shown in FIG. 5.

So as to obtain the desired wavelength determinable range F', light receiving elements PD_A and PD_B having the peak wavelengths that are at such a distance from each other as to sandwich the desired wavelength determinable range F' should be combined. However, the light receiving elements PD to be employed vary with the desired wavelength determinable range F. Therefore, it is very difficult to select suitable light receiving elements PD for every wavelength determinable range F'.

Document 1 also discloses a structure in which the wavelength determinable range F can be varied by controlling the temperatures of the two light receiving elements PD (the photoelectric converter layers 101 and 102). In that conventional structure, however, both of the light receiving elements PD are controlled at the same temperature. When the temperature rises, as shown in FIG. 6, the wavelength determinable range for simultaneous measurement merely moves from F1 to F2, and cannot be widened. Furthermore, if the light receiving element that decides the lower limit (the light receiving element PD_A in the example shown in FIG. 6) exhibits a greater temperature dependency in the wavelength sensitivity, i.e., a greater shifting amount of the peak wavelength with respect to the temperature change, the bandwidth of the wavelength determinable range F2 after the temperature rise is smaller than the bandwidth of the wavelength determinable range F1 prior to the temperature rise. If the light receiving element that decides the upper limit (PD_B) exhibits a greater shifting amount of the peak wavelength with respect to a change in temperature, on the other hand, the bandwidth of the temperature determinable range after the temperature drop is smaller than the bandwidth of the wavelength determinable range prior to the temperature drop.

SUMMARY OF THE INVENTION

It is therefore an object of the present invention to provide a wavelength measuring device, a light receiving unit, and a wavelength measuring method, in which the above disadvantages are eliminated.

A more specific object of the present invention is to provide a wavelength measuring device, a light receiving unit, and a wavelength measuring method that can easily realize a high-precision wavelength determining operation in a desired wavelength region.

The above objects of the present invention are achieved by a wavelength measuring device comprising: a plurality of light receiving elements that receive light to be measured; a temperature controller that maintains the light receiving elements at different temperatures from one another; and a calculation unit that determines the wavelength of the light to be measured, based on outputs of the light receiving elements.

The above objects of the present invention are also achieved by a wavelength measuring device comprising: a light receiving element that receives light to be measured; a temperature controller that maintains the light receiving element at temperatures that vary with time; and a calculation unit that determines the wavelength of the light to be measured, based on outputs of the light receiving element obtained with time.

The above objects of the present invention are also achieved by a light receiving unit comprising: a plurality of light receiving elements that receive light to be measured; and a temperature controller that applies different temperatures to the respective light receiving elements, the light receiving elements outputting detection outputs with respect to the light to be measured.

The above objects of the present invention are also achieved by a light receiving unit comprising: a light receiving element that receives light to be measured; and a temperature controller that applies a temperature to the light receiving element, the temperature varying with time, the light receiving element outputting detection outputs with respect to the light to be measured, the detection outputs being obtained with time.

The above objects of the present invention are also achieved by a wavelength measuring method comprising the steps of: determining the wavelength of light to be measured, based on outputs from a plurality of light receiving elements that receive the light to be measured; and applying different temperatures to the respective light receiving elements.

The above objects of the present invention are also achieved by a wavelength measuring method comprising the steps of: applying a first temperature to a light receiving element; obtaining an output from the light receiving element that has received light to be measured and to which the first temperature has been applied; applying a second temperature to the light receiving element; obtaining an output from the light receiving element that has received the light to be measured and to which the second temperature has been applied; and determining the wavelength of the light to be measured, based on the outputs obtained from the light receiving element.

BRIEF DESCRIPTION OF THE DRAWINGS

Other objects, features and advantages of the present invention will become more apparent from the following detailed description when read in conjunction with the accompanying drawings, in which:

FIG. 8A is a graph showing two sensitivity curves that are controlled in accordance with the present invention;

FIG. 8B is a graph showing the sensitivity ratio obtained from the sensitivity curves shown in FIG. 8A;

DESCRIPTION OF THE PREFERRED EMBODIMENTS

Principles of the Invention

First, the principles of the present invention are described. The object of the present invention is to realize a high-precision wavelength determining operation in a desired wavelength region. So as to achieve this object, the wavelength-sensitivity characteristics (hereinafter referred to simply as the "sensitivity characteristics") physically determined by a semiconductor material or the like are made variable in the present invention. More specifically, the sensitivity characteristics of light receiving elements are varied by controlling the temperatures of the light receiving elements in the present invention.

Figure 1:
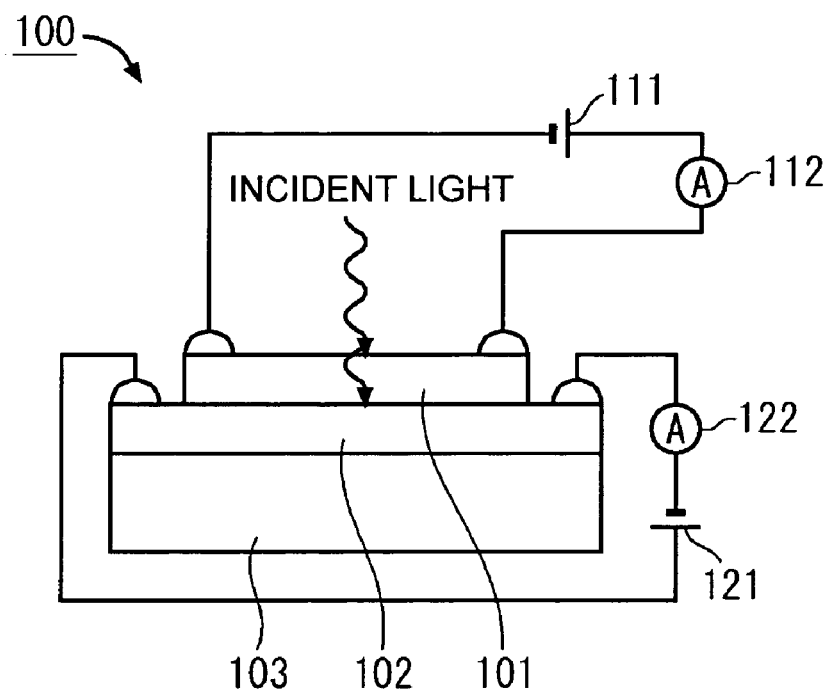
FIG. 1 is a circuit diagram illustrating a conventional structure for determining a wavelength.
Figure 2:
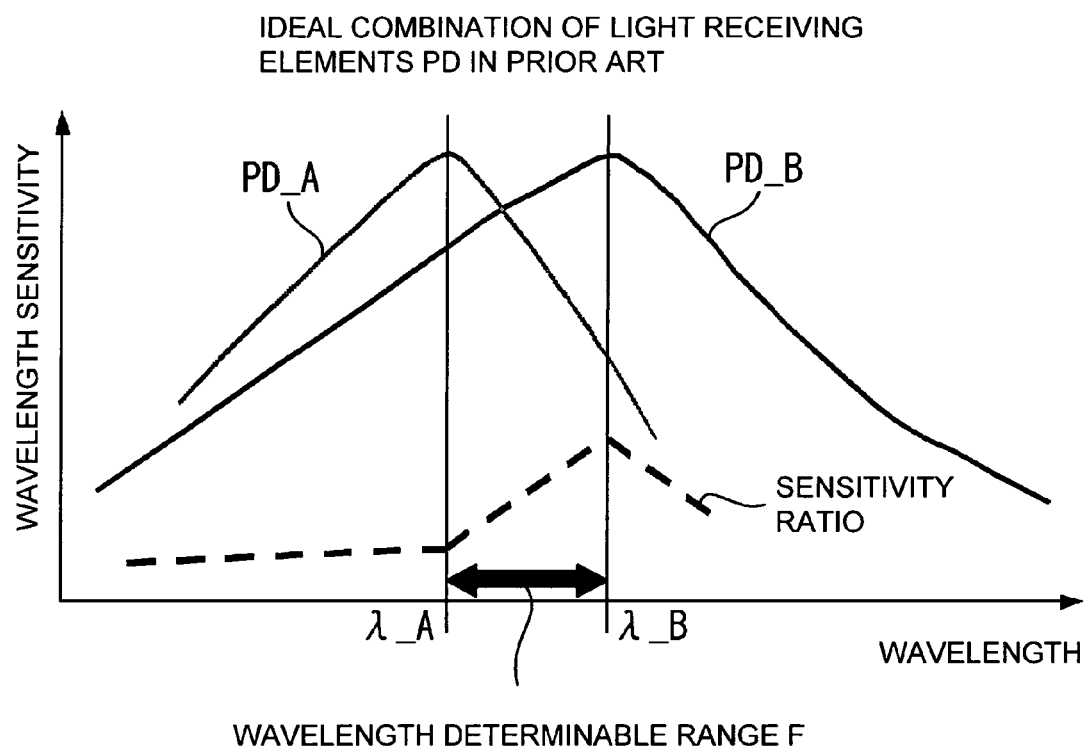
FIG. 2 is a graph showing the sensitivity curves obtained in the case where light receiving elements with ideally different sensitivity characteristics are combined in the prior art.
Figure 3:
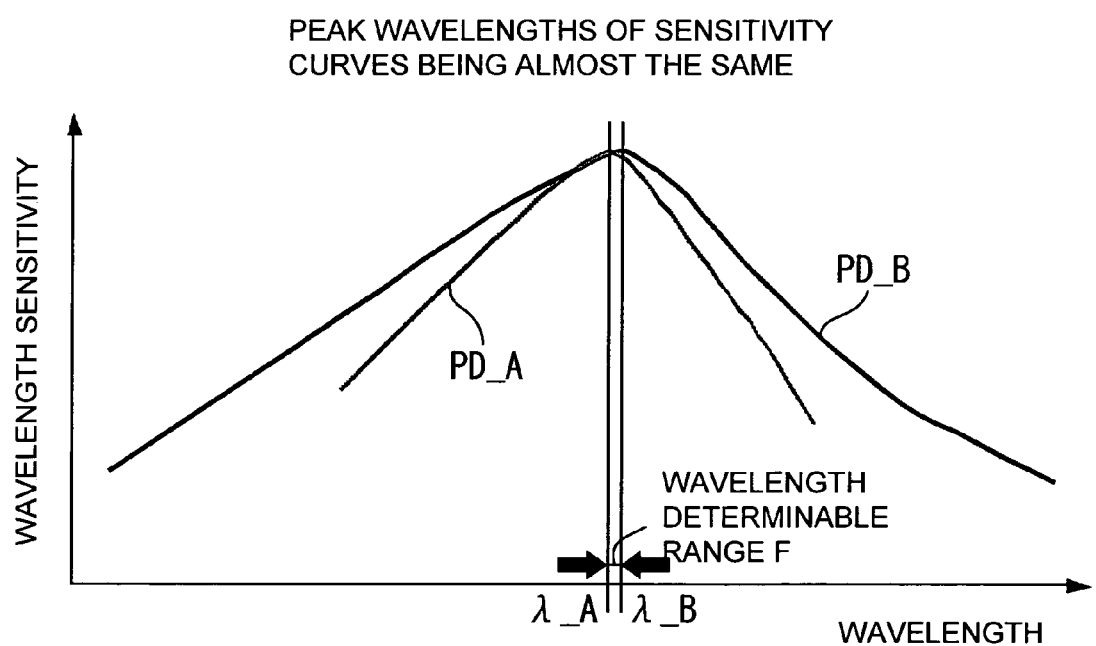
FIG. 3 illustrates the problem caused in the case where the sensitivity characteristics of two light receiving elements exhibit almost the same peak wavelengths in the prior art.
Figure 4:
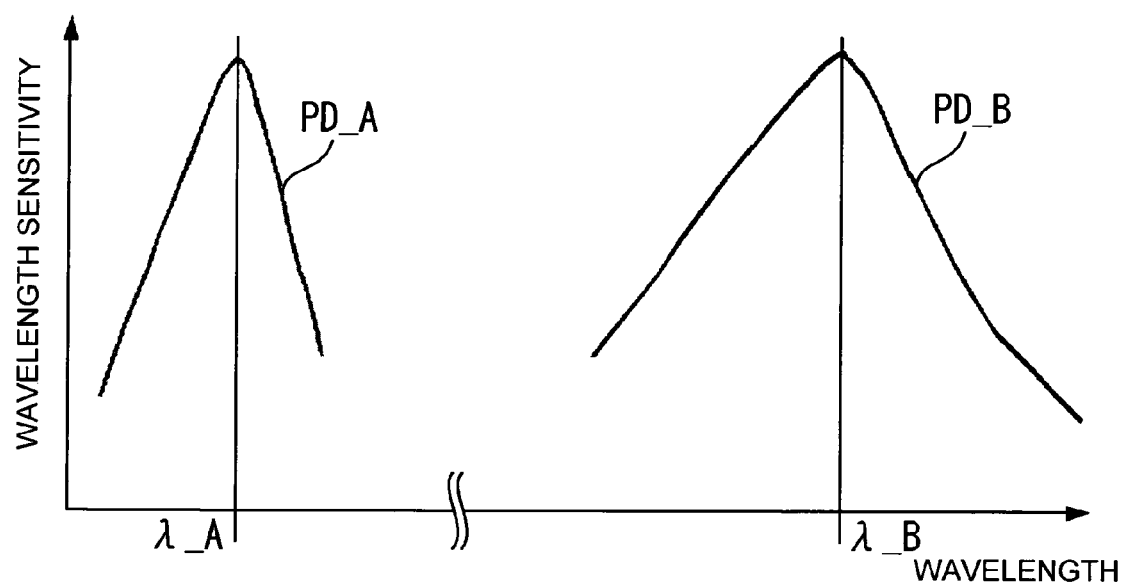
FIG. 4 illustrates the problem caused in the case where the sensitivity characteristics of two light receiving elements exhibit too different peak wavelengths in the prior art.
Figure 5:
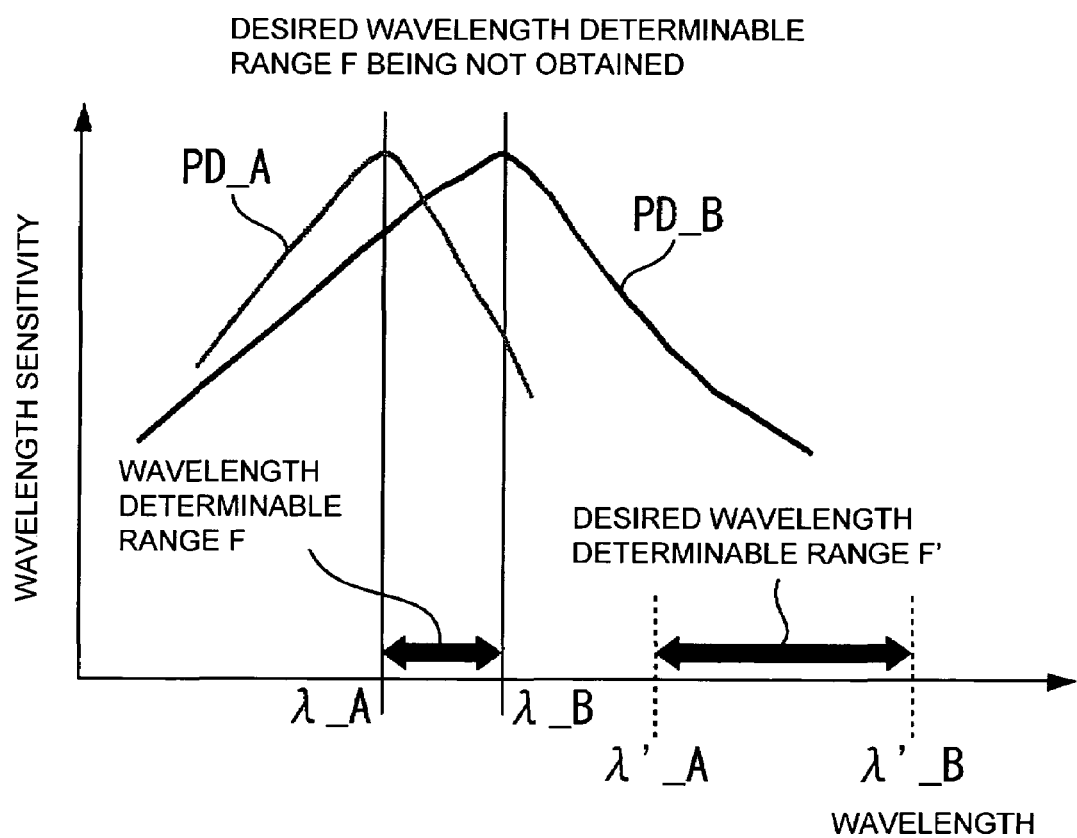
FIG. 5 is a graph illustrating the case where the wavelength determinable range F obtained with two light receiving elements does not cover a desired wavelength determinable range F' at all in the prior art.
Figure 6:
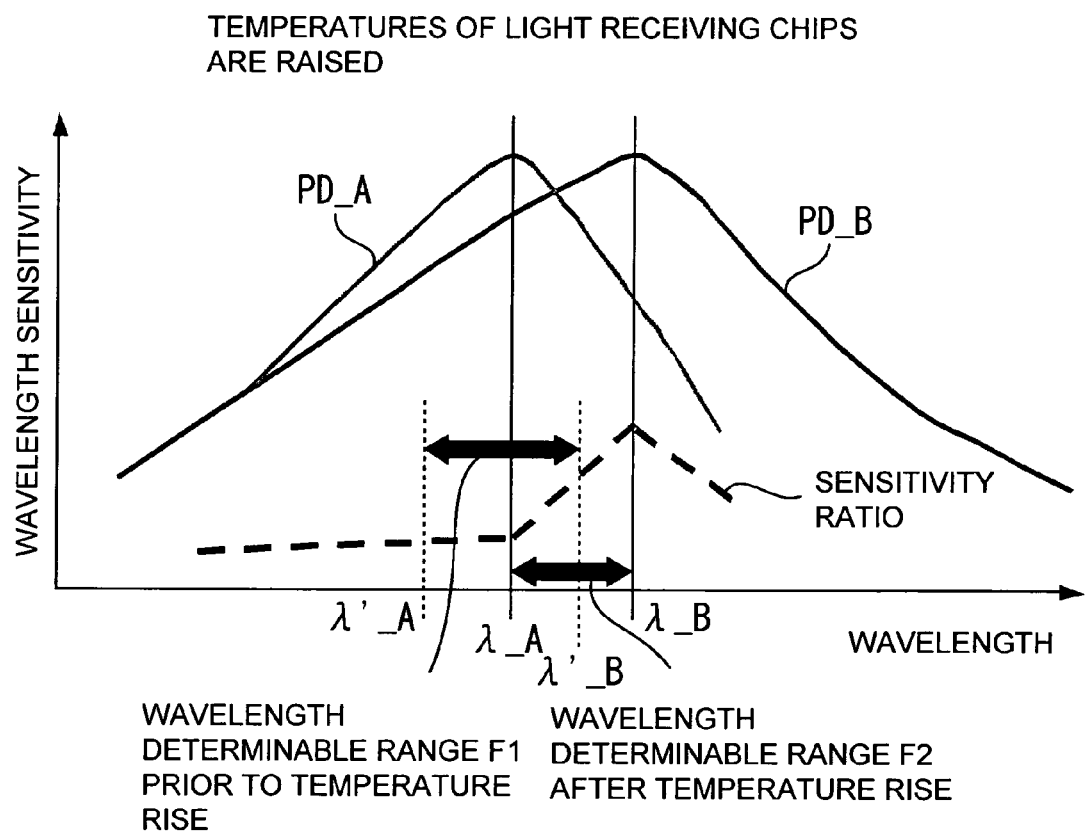
FIG. 6 illustrates the problem caused when the temperatures of two light receiving elements are raised in the prior art.
Figure 7:
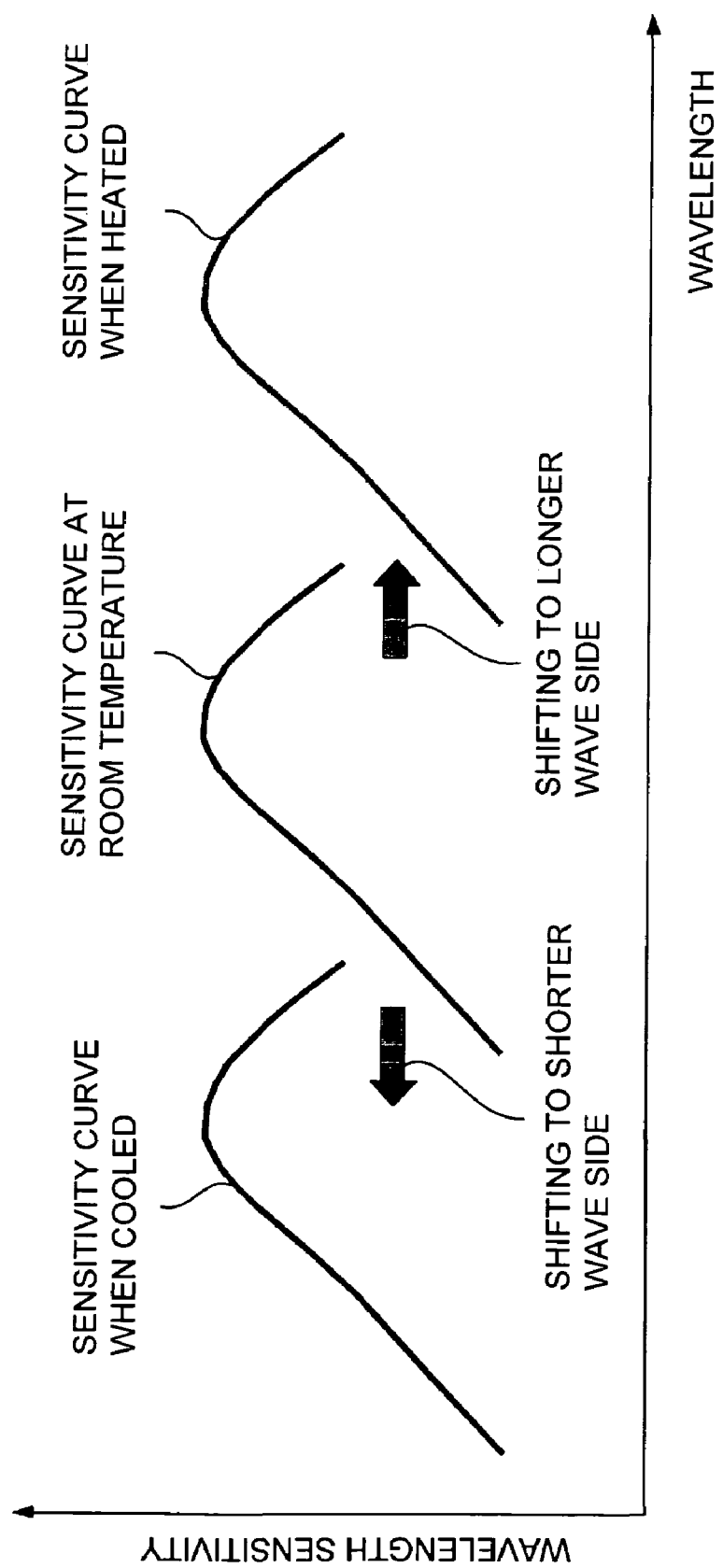
FIG. 7 illustrates the shifting of the sensitivity curves observed in the case where the temperatures of general light receiving elements made of a semiconductor material are changed.

As shown in FIG. 7, the curve of the sensitivity characteristics (the sensitivity curve) of a general light receiving element shifts to the shorter wavelength side, when the light receiving element is cooled. Here, the light receiving element is made of a semiconductor material such as silicon (Si), gallium arsenic (GaAs), or indium phosphide (InP). When this light receiving element is heated, the sensitivity curve shifts to the longer wavelength side. The present invention is to take advantage of such characteristics of light receiving elements. As shown in FIG. 8A, the temperatures of light receiving elements are controlled so that the peak wavelength at which a sensitivity curve (on the low temperature side) reaches its peak, and the peak wavelength at which the other sensitivity curve (on the high temperature side) reaches its peak, sandwich the desired wavelength region, or so that the wavelength determinable range that is defined by the peak wavelengths of the two sensitivity curves includes the desired wavelength region. The sensitivity curve ratio (the sensitivity ratio) obtained by controlling the temperatures in this manner exhibits a preferable slope at least in the desired wavelength region, as shown in FIG. 8B. Thus, the wavelength of light to be measured can be accurately determined in the desired wavelength region in the present invention. In the example case shown in FIGS. 8A and 8B, the temperature of a single light receiving element or the temperatures of light receiving elements with the same characteristics are controlled. However, the present invention is not limited to such a case, and the same effects as the above can be obtained in a case where the temperatures of two or more light receiving elements with different characteristics are controlled. In that case, however, the high temperature side and the low temperature side shown in FIGS. 8A and 8B might change sides, depending on the type of combination of light receiving elements.

Figure 9:
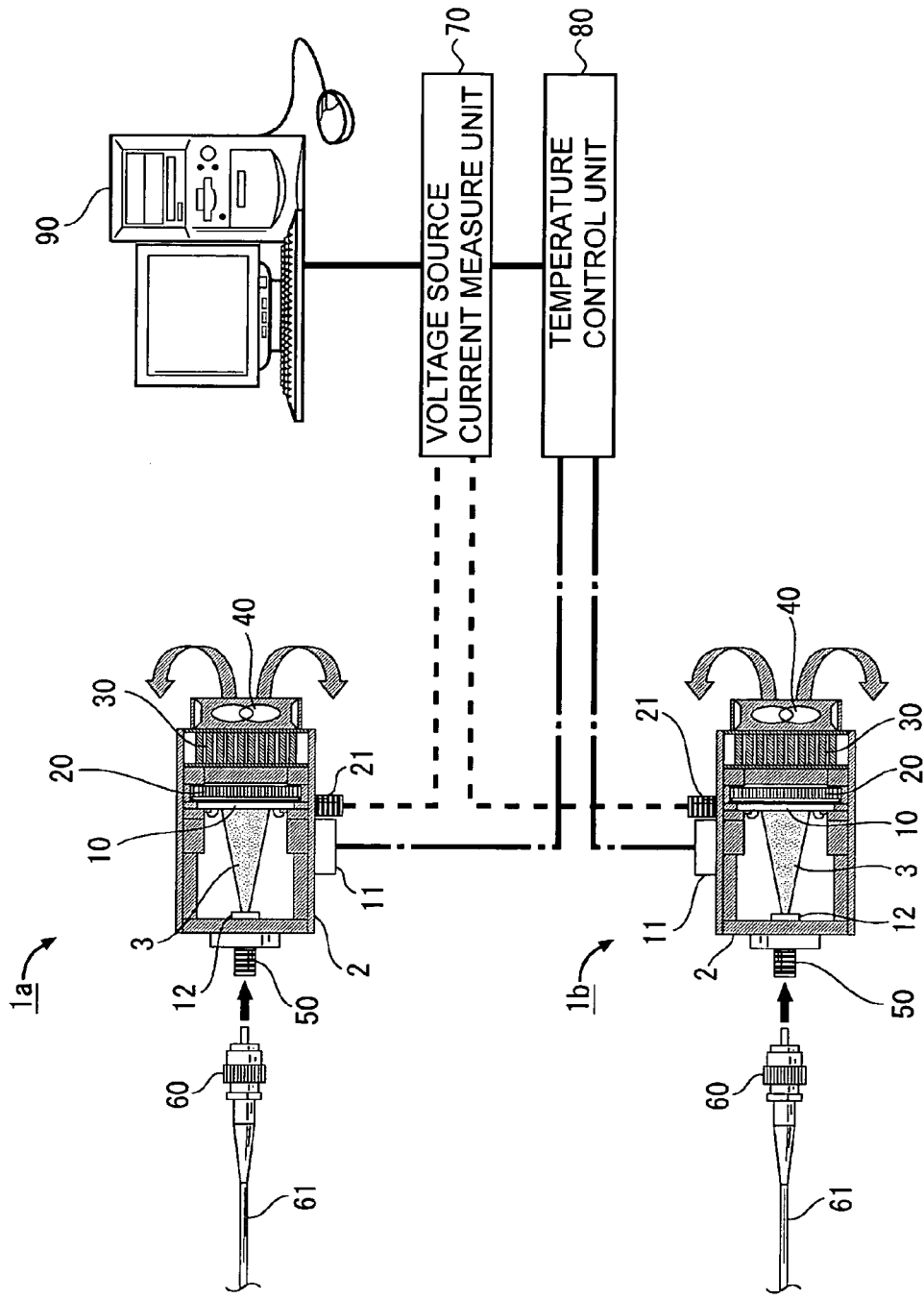
FIG. 9 is a block diagram illustrating the structure based on the principles of the present invention.

Referring now to FIG. 9, the structure of the present invention based on the above principles is described. In the present invention, the temperature of one or more light receiving elements is controlled to obtain two or more different types of sensitivity characteristics (however, two different types of sensitivity characteristics are involved in the description below). Therefore, temperature controllers (including Peltier devices 20) for controlling the temperature of two light receiving elements (light receiving chips 10) are provided in the present invention.

More specifically, light receiving units 1a and 1b (hereinafter referred simply as the light receiving unit 1) each includes a light receiving chip (the light receiving chip 10) that outputs a current in accordance with input measurement light 3 (the current will be hereinafter referred to as the "photoelectric conversion current"), and a temperature controller (including the Peltier device 20, a radiator fin 30, and an air cooling fan 40) that controls the temperature of the light receiving chip. The light receiving chip and the temperature controller are housed in a housing 2. A window 12 that transmits the measurement light 3 is provided on the wall of the housing 2 that faces the light receiving face of the light receiving chip. This structure is designed so that the measurement light 3 transmitted through an optical cable 61 is incident on the light receiving face via a female optical connector 50 and a male optical connector 60.

The photoelectric conversion current outputted from the light receiving chip is inputted into a current monitor power source unit 70 that is connected via a connector (a light-receiving-chip current detection connector 21). The current monitor power source unit 70 quantizes the current value of the inputted photoelectric conversion current (the current value will be hereinafter referred to as the "photoelectric conversion current value"), and inputs the obtained value (also the "photoelectric conversion current value") into a control computer 90. Using its operation function, the control computer 90 determines the wavelength of the measurement light 3, based on the inputted photoelectric conversion current value. More specifically, the control computer 90 calculates the ratio between the photoelectric conversion current values outputted from the light receiving chips controlled to have different wavelength characteristics, and then determines the wavelength of the measurement light 3 in accordance with the obtained ratio.

The control computer 90 controls a temperature controlling unit 80. The temperature controlling unit 80 is connected to the Peltier device 20 of each temperature controller via a control terminal (a Peltier device control terminal 11), and drives and controls the Peltier device 20 so as to apply a temperature to the corresponding light receiving chip. Thus, the temperature of each light receiving chip is controlled. The temperature controlling unit may be conceptually included in the temperature controllers. Also, one temperature controller may control two or more light receiving chips to have different temperatures from one another. Further, the temperature controlling unit 80 may control the radiator fin 30 and the air cooling fan 40.

In the above structure, the light receiving units 1a and 1b may have the same structures or different structures. With different structures, the light receiving chips 10 may exhibit substantially the same sensitivity characteristics or different sensitivity characteristics from each other. In the present invention, each of the light receiving chips 10 may be a light receiving chip that is made of a semiconductor material such as silicon (Si), gallium arsenic (GaAs), or indium phosphide (InP). However, the present invention is not limited to such light receiving chips, and any light receiving chip can be employed, as long as the sensitivity curve varies with a change in temperature. Other than that, it is possible to employ light receiving chips or photomultiplier tubes that are made of organic materials, as the sensitivity characteristics vary with temperature. Also, the sensitivity characteristics that the light receiving chips are expected to exhibit in the present invention can be controlled by temperature, and light receiving chips with any type of sensitivity characteristics can be employed. Accordingly, it is not necessary to combine light receiving chips, with the wavelength characteristics being taken into consideration, as in the prior art. Thus, light receiving chips can be selected and employed at will in the present invention.

The temperature controller controls the temperatures of the light receiving unit 1a and the light receiving unit 1b separately from each other, so that the peak wavelength of the sensitivity curve of one (the light receiving unit 1a) of the light receiving chips appears on the shorter wavelength side of a desired wavelength region, and that the peak wavelength of the sensitivity curve of the other one (the light receiving unit 1b) of the light receiving chips appears on the longer wavelength side of the desired wavelength region. By doing so, such a wavelength determinable area as to contain the desired wavelength region can be set, and the wavelength of the measurement light 3 can be accurately determined in the wavelength region. Particularly, the sensitivity characteristics of the two light receiving chips are controlled so that the center wavelength of the measurement light 3 becomes the center wavelength of the wavelength determinable region. By doing so, the wavelength determinable region can be effectively set. Further, the temperatures of the two light receiving chips can be varied by the temperature controller, and the bandwidth of the wavelength determinable region can be widened by controlling the temperature difference between the two light receiving chips. As the bandwidth of the wavelength determinable region is widened, a wide "dynamic range" can be secured for the wavelength determining operation.

The following is a description of preferred embodiments of the present invention based on the above principles, with reference to the accompanying drawings.

First Embodiment

A first embodiment of the present invention is now described. In FIG. 9, two or more light receiving chips (two light receiving chips in the example shown in FIG. 9) and temperature controllers are housed in separate housings. In this embodiment, however, two or more light receiving chips and temperature controllers are housed in the same housing. In the following case, two sets of light receiving chips and temperature controllers are employed.

Figure 10:
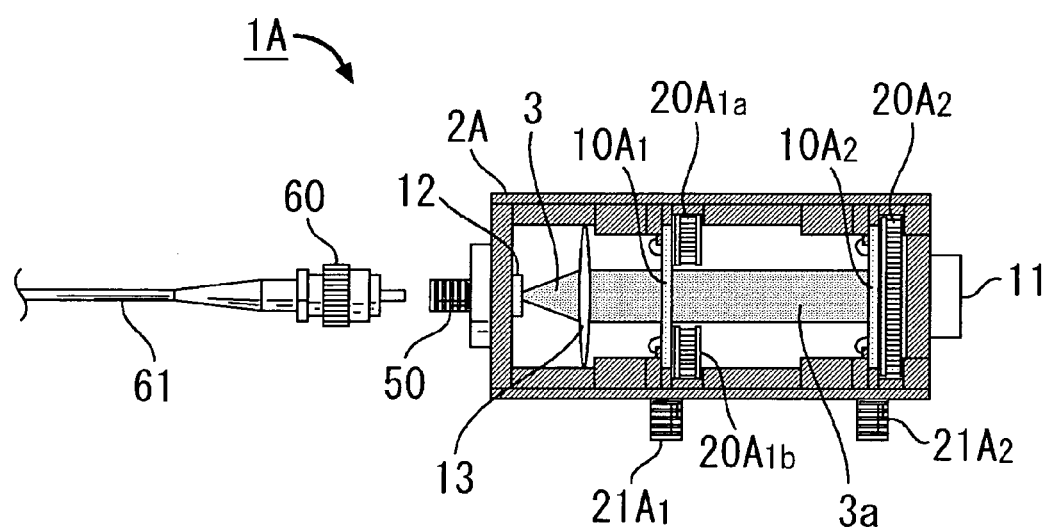
FIG. 10 is an inner perspective view illustrating the structure of a light receiving unit in accordance with a first embodiment of the present invention.

FIG. 10 is an inner perspective view illustrating the structure of a light receiving unit 1A in accordance with the first embodiment of the present invention. As shown in FIG. 10, the light receiving unit 1A of this embodiment includes: a collimator lens 13 that converts the measurement light 3 inputted through the window 12 into parallel light; a semi-transmissive light receiving chip $10A_1$ that first receives the measurement light 3, which has been converted into parallel light; a semi-transmissive light receiving chip $10A_2$ that receives the transmitted light 3a transmitted through the light receiving chip $10A_1$; Peltier devices $20A_{1a}$ and $20A_{1b}$ that control the temperature of the light receiving chip $10A_1$; and a Peltier device $20A_2$ that controls the temperature of the light receiving chip $10A_2$, all of which are housed in a housing 2A. The window 12 is made of quartz glass, for example. One surface of the window 12 faces the outside of the housing 2A, and the other surface of the window 12 faces the inside of the housing 2A.

The inside of the housing 2A should be vacuum or filled with inert gas or nitrogen gas, so as to prevent condensation on the light receiving faces of the light receiving chips $10A_1$ and $10A_2$ and deterioration of the detection characteristics. The female optical connector 50, which is to be engaged with the male optical connector 60 provided at one end of the optical cable 61, is provided on the outside of the window 12 of the housing 2A. The other end of the optical cable 61 is connected to a light source.

The measurement light 3 outputted from the light source is transmitted through the optical cable 61, and enters the housing 2A through the window 12 via the male optical connector 60 and the female optical connector 50. The measurement light 3, which has entered the housing 2A, is converted into parallel light by the collimator lens 13, and then reaches the light receiving face of the light receiving chip $10A_1$.

The light receiving chip $10A_1$ is a semi-transmissive light receiving chip with a transmittance of 50%, for example. Based on 50% of the light quantity of the incident measurement light 3, the light receiving chip $10A_1$ generates a current (a photoelectric conversion current $I_1$). The generated photoelectric conversion current $I_1$ is outputted to the current monitor power source unit 70 (shown in FIG. 9) via a light-receiving-chip current detection connector $21A_1$. However, the transmittance of the light receiving chip $10A_1$ is not limited to 50%, but may have any transmittance as long as it can absorb and transmit a sufficient quantity of light.

Also, 50% of the measurement light 3 incident to the light receiving chip $10A_1$ is transmitted through the light receiving chip $10A_1$, and reaches the light receiving face of the light receiving chip $10A_2$. Based on the light quantity of the transmitted light 3a, the light receiving chip $10A_2$ generates a current (a photoelectric conversion current $I_2$). The generated photoelectric conversion current $I_2$ is outputted to the current monitor power source unit 70 (shown in FIG. 9) via a light-receiving-chip current detection connector $21A_2$.

In this embodiment, the light receiving chips $10A_1$ and $10A_2$ are light receiving chips with the same sensitivity characteristics. However, even if the light receiving chips have different sensitivity characteristics, the same structure as the above can be employed. The light receiving chips $10A_1$ and $10A_2$ are controlled by the temperature controlling unit 80 (shown in FIG. 9) connected via the Peltier device control terminal 11. Here, the light receiving chip $10A_1$ is a low-temperature light receiving chip that has the peak wavelength of the sensitivity curve located on the shorter wavelength side of the desired wavelength region, while the light receiving chip $10A_2$ is a high-temperature light receiving chip that has the peak wavelength of the sensitivity curve located on the longer wavelength side of the desired wavelength region. In this condition, the temperature controlling unit 80 controls the Peltier devices $20A_{1a}$ and $20A_{1b}$ so as to keep the light receiving chip $10A_1$ on the lower temperature side, while controlling the Peltier device $20A_2$ so as to keep the light receiving chip $10A_2$ on the higher temperature side.

As described above, in this embodiment, the two light receiving chips $10A_1$ and $10A_2$ that are controlled to have different temperatures are arranged in series in the incident direction of the measurement light 3. The light receiving chip $10A_2$ receives the measurement light 3 (the transmitted light 3a) transmitted through the light receiving chip $10A_1$. Based on the photoelectric conversion current value ratio obtained from the light receiving chips $10A_1$ and $10A_2$, the wavelength of the measurement light 3 is determined.

In this manner, the two light receiving chips ($10A_1$ and $10A_2$) are controlled by the separate temperature controllers (the Peltier devices $20A_1$ and $20A_2$) so as to have different temperatures (the lower temperature side and the higher temperature side). Accordingly, the peak wavelength of the sensitivity curve of each of the light receiving chips $10A_1$ and $10A_2$ can be adjusted to a desired wavelength. Thus, such a wavelength determinable range as to include the desired wavelength region can be set (see FIG. 8).

Figure 11:
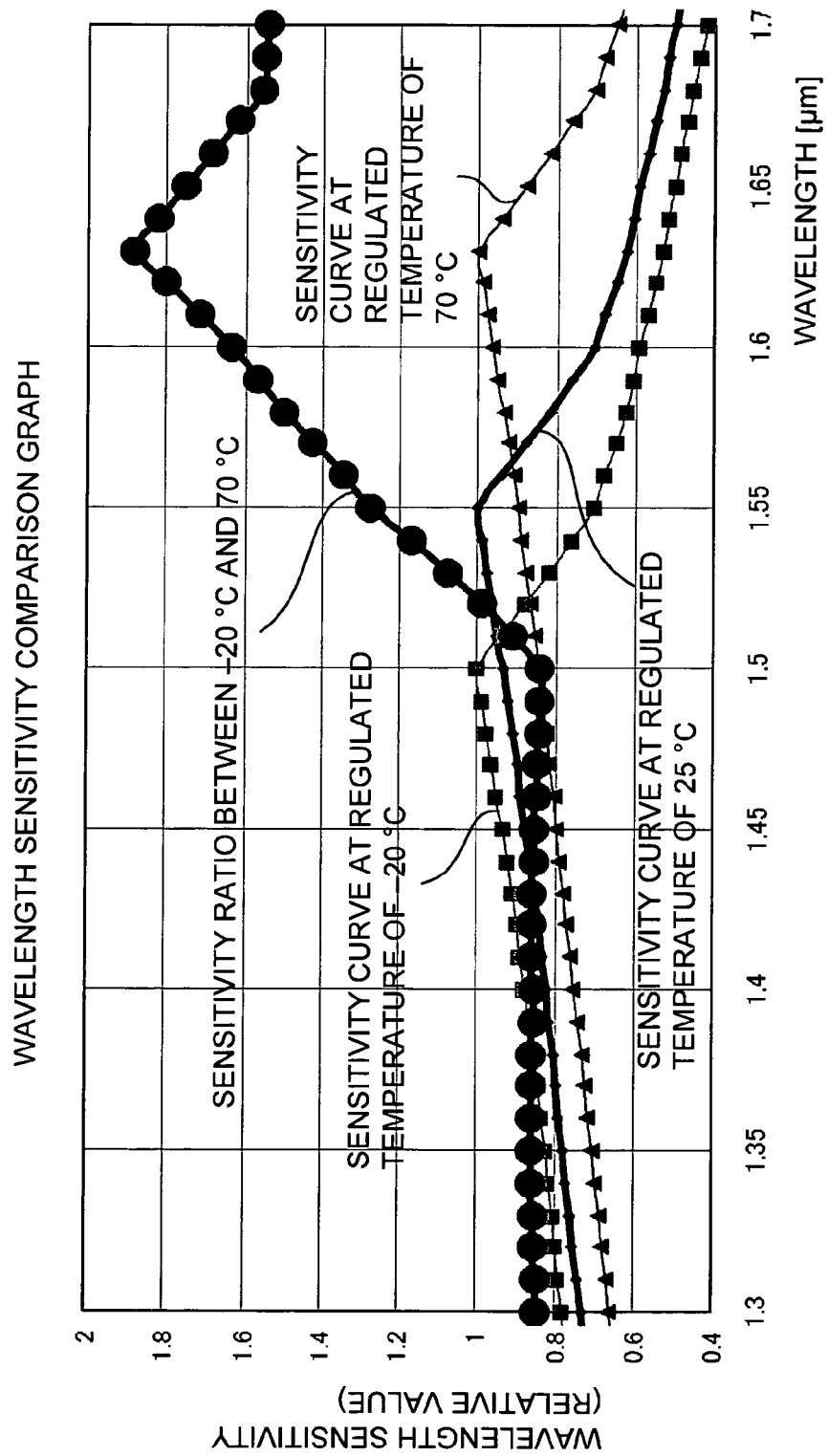
FIG. 11 is a graph showing the sensitivity characteristics and sensitivity ratio that are obtained at each temperature in the first embodiment in practical use.
Figure 12:
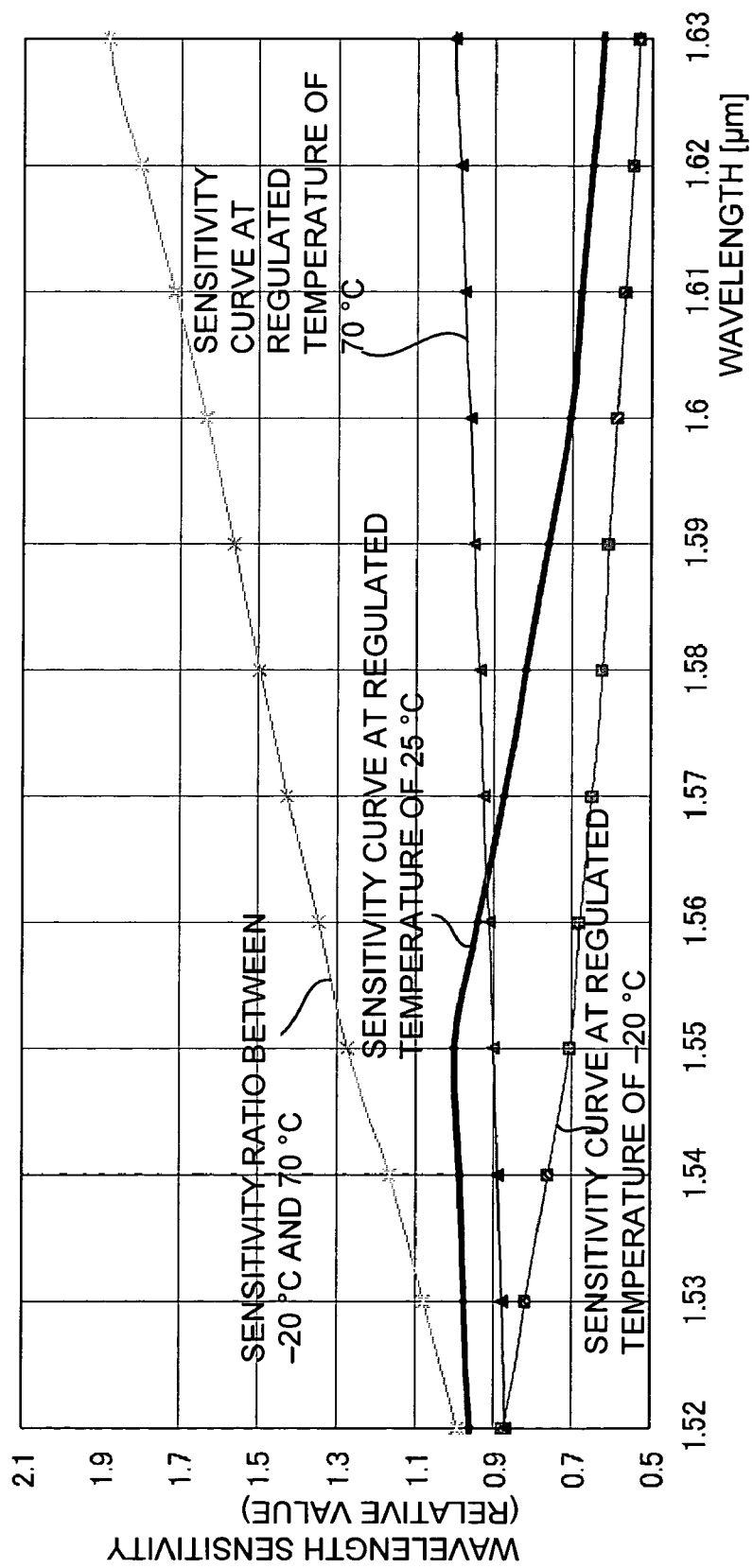
FIG. 12 is an enlarged view of the region in the vicinity of the 1.6 μm wavelength of the graph shown in FIG. 11.

The sensitivity characteristics and sensitivity ratio obtained at each temperature in the above structure in practical use are shown in the graphs in FIGS. 11 and 12. In the following case, the light receiving chips $10A_1$ and $10A_2$ are light receiving chips that are produced by Hamamatsu Photonics K.K.

FIG. 11 is a graph showing the sensitivity curves and sensitivity ratios that are obtained where the light receiving chip $10A_1$ is adjusted to −20 degrees C. while the light receiving chip $10A_2$ is adjusted to 70 degrees C. FIG. 12 is an enlarged view of the region in the vicinity of 1.6 μm (between 1.52 μm and 1.63 μm) in FIG. 11. For reference, the sensitivity curves that are obtained where the light receiving chips $10A_1$ and $10A_2$ are maintained at a room temperature (25 degrees C.) are also shown. Also, for easier understanding of the comparison results, each of the sensitivity curves is standardized with wavelength sensitivity peak values. As shown in FIGS. 11 and 12, the sensitivity curve of the light receiving chip $10A_2$ adjusted to 70 degrees C. is shifted to the longer wavelength side, compared with the sensitivity curve of the light receiving chip $10A_1$ adjusted to −20 degrees C. Also, sensitivity ratios that exhibit a desirable slope can be obtained in the wavelength determinable range in the vicinity of 1.6 μm, which is the wavelength region between the peak wavelength of the sensitivity curve of the light receiving chip $10A_1$ adjusted to −20 degrees and the peak wavelength of the sensitivity curve of the light receiving chip $10A_2$ adjusted to 70 degrees. In the specific example shown in FIGS. 11 and 12, the wavelength determinable range is located between the peak wavelength (=1.5 μm) of the sensitivity curve of the light receiving chip $10A_1$ adjusted to −20 degrees and the peak wavelength (=1.63 μm) of the sensitivity curve of the light receiving chip $10A_2$ adjusted to 70 degrees, and excellent sensitivity ratios are obtained in this wavelength range.

As described above, the wavelength determinable range of this embodiment can be set suitably for various purposes. For example, the wavelength determinable range can be widened by lowering the temperature of the light receiving chip $10A_1$ on the shorter wavelength side and increasing the temperature of the light receiving chip $10A_2$ on the longer wavelength side.

Figure 13:
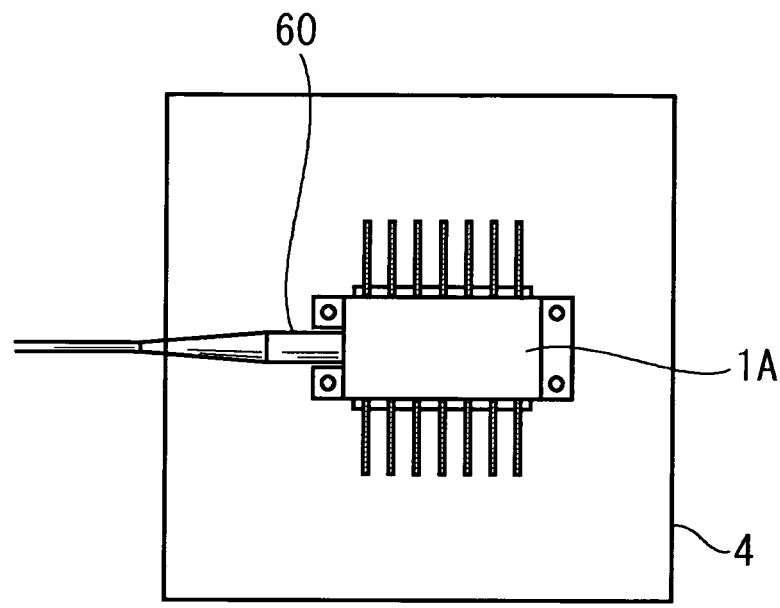
FIG. 13 is an external view illustrating the light receiving unit of the first embodiment mounted on a circuit board.

The light receiving unit 1A of this embodiment may also be mounted on a circuit board 4, as shown in FIG. 13.

Second Embodiment

Next, a second embodiment of the present invention is described, with reference to the accompanying drawing. In the first embodiment described above, light receiving chips are arranged in multi-stages, and the first-stage light receiving chip is semi-transmissive so that the multi-stage light receiving chips can simultaneously receive the measurement light. In this embodiment, however, the housing that holds the light receiving chips is rotatable, and light receiving chips are arranged on the side surface of the rotatable housing, which is the surface that moves rotatably. In this structure, the light receiving chips can also receive the measurement light. In the following case, two sets of light receiving chips and temperature controllers are employed. Also, in the following description, the same components as those in the first embodiment are denoted by the same reference numerals as in the first embodiment, and explanation of them is omitted.

Figure 14:
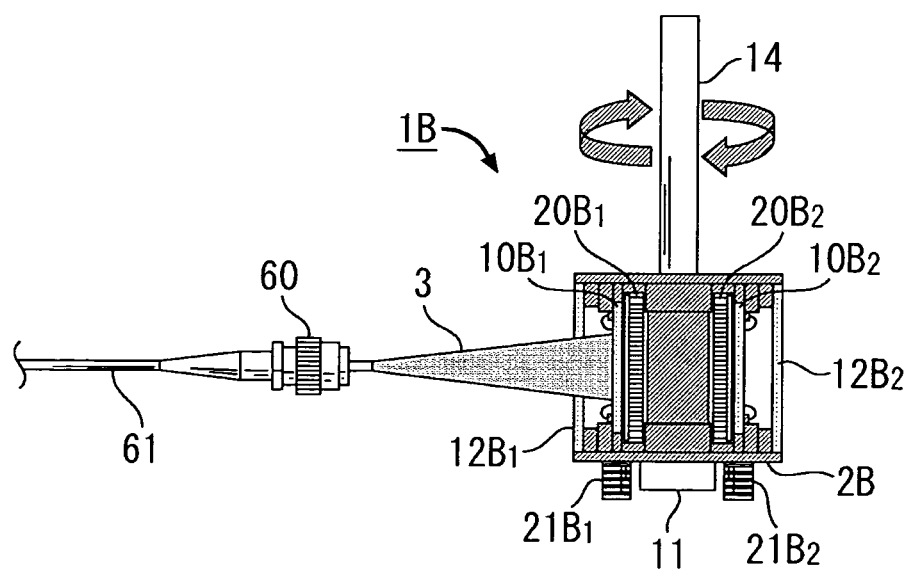
FIG. 14 is an inner perspective view illustrating the structure of a light receiving unit in accordance with a second embodiment of the present invention.

FIG. 14 is an inner perspective view illustrating the structure of a light receiving unit 1B in accordance with this embodiment. As shown in FIG. 14, the light receiving unit 1B of this embodiment includes: windows $12B_1$ and $12B_2$ that are provided in the locations facing each other on the surface of a housing 2B; a light receiving chip $10B_1$ that receives the measurement light 3 transmitted through the window $12B_1$; a light receiving chip $10B_2$ that receives the measurement light 3 transmitted through the window $12B_2$; a Peltier device $20B_1$ that controls the temperature of the light receiving chip $10B_1$; and a Peltier device $20B_2$ that controls the temperature of the light receiving chip $10B_2$, all of which are housed in the housing 2B. The windows $12B_1$ and $12B_2$ are made of quartz glass, for example. One surface of each of the windows $12B_1$ and $12B_2$ faces the outside of the housing 2B, while the other surface on the opposite side faces the inside of the housing 2B.

A rotation mechanism 14 is provided on the side surface of the housing 2B. The rotation mechanism 14 is designed to rotate the light receiving unit 1B together with the housing 2B. With this structure, the light receiving chips $10B_1$ and $10B_2$ both can receive the measurement light 3 via the windows $12B_1$ and $12B_2$.

The inside of the housing 2B should be evacuated or filled with inert gas or nitrogen gas, so as to prevent condensation on the light receiving faces of the light receiving chips $10B_1$ and $10B_2$ and deterioration of the detection characteristics. The male optical connector 60 provided at one end of the optical cable 61, which outputs the measurement light 3, is fixed at a predetermined distance from the light receiving unit 1B. The other end of the optical cable 61 is connected to a light source.

The measurement light 3 outputted from the light source is transmitted through the optical cable 61, and is released from the end of the optical cable 61. When the window $12B_1$ faces the end of the optical cable 61, the measurement light 3 reaches the light receiving face of the light receiving chip $10B_1$ via the window $12B_1$. When the window $12B_2$ faces the end of the optical cable 61, the measurement light 3 reaches the light receiving face of the light receiving chip $10B_2$ via the window $12B_2$.

Based on the light quantity of the incident measurement light 3, the light receiving chips $10B_1$ and $10B_2$ generate currents (photoelectric conversion currents $I_1$, and $I_2$). The generated photoelectric conversion currents $I_1$, and $I_2$ are outputted to the current monitor power source unit 70 (shown in FIG. 9) via light-receiving-chip current detection connectors $21B_1$ and $21B_2$, respectively.

In this embodiment, the light receiving chips $10B_1$ and $10B_2$ are light receiving chips with the same sensitivity characteristics. However, even if the light receiving chips have different sensitivity characteristics, the same structure as the above can be employed. The light receiving chips $10B_1$, and $10B_2$ are controlled by the temperature controlling unit 80 (shown in FIG. 9) connected via the Peltier device control terminal 11. Here, the light receiving chip $10B_1$, is a low-temperature light receiving chip that has the peak wavelength of the sensitivity curve located on the shorter wavelength side of the desired wavelength region, while the light receiving chip $10B_2$ is a high-temperature light receiving chip that has the peak wavelength of the sensitivity curve located on the longer wavelength side of the desired wavelength region. In this condition, the temperature controlling unit 80 controls the Peltier device $20B_1$ so as to keep the light receiving chip $10B_1$ on the lower temperature side, while controlling the Peltier device $20B_2$ so as to keep the light receiving chip $10B_2$ on the higher temperature side.

As described above, in this embodiment, the rotation mechanism 14 that rotatably holds the two light receiving chips $10B_1$, and $10B_2$ controlled to have different temperatures. With the rotation mechanism 14, the two light receiving chips $10B_1$ and $10B_2$ are alternately moved to the incident point of the measurement light 3. Based on the photoelectric conversion current value ratio obtained from the light receiving chips $10B_1$, and $10B_2$, the wavelength of the measurement light 3 is determined. Although the light receiving chips $10B_1$, and $10B_2$ are rotated in the above description, it is also possible to rotate the output end of the measurement light 3, which is the end of the optical cable 61, around the light receiving unit 1B.

In this embodiment, the two light receiving chips $10B_1$ and $10B_2$ face the back of each other, and a housing material is interposed between the light receiving chips $10B_1$, and $10B_2$ (as shown in FIG. 14). With this arrangement, the thermal conversion efficiency between the light receiving chips $10B_1$, and $10B_2$ can be increased, and accordingly, the light receiving unit 1B can be made smaller in size.

In this manner, the two light receiving chips (the light receiving chips $10B_1$, and $10B_2$) are controlled by the separate temperature controllers (the Peltier devices $20B_1$ and $20B_2$) so as to have different temperatures (the lower temperature side and the higher temperature side). Accordingly, the peak wavelength of the sensitivity curve of each of the light receiving chips $10B_1$, and $10B_2$ can be adjusted to a desired wavelength. Thus, such a wavelength determinable range as to include the desired wavelength region can be set (see FIG. 8). The other aspects of this embodiment are the same as the first embodiment, and therefore, explanation of them is omitted herein.

Third Embodiment

Next, a third embodiment of the present invention is described, with reference to the accompanying drawing. In the first embodiment described above, light receiving chips are arranged in multi-stages, and the first-stage light receiving chip is semi-transmissive so that the multi-stage light receiving chips can simultaneously receive the measurement light. In this embodiment, however, a beam splitter that divides the measurement light into several beams is employed, so that light receiving chips receive the beams in one-to-one correspondence. In the following case, two sets of light receiving chips and temperature controllers are employed. Also, in the following description, the same components as those in the first embodiment are denoted by the same reference numerals as in the first embodiment, and explanation of them is omitted.

Figure 15:
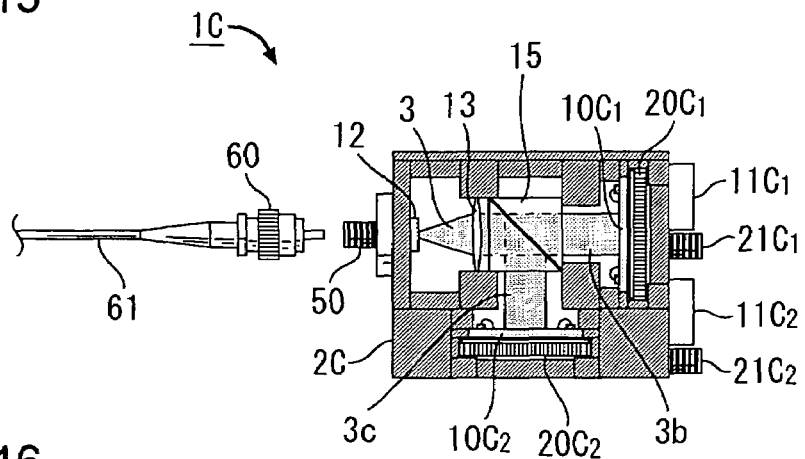
FIG. 15 is an inner perspective view illustrating the structure of a light receiving unit in accordance with a third embodiment of the present invention.

FIG. 15 is an inner perspective view illustrating the structure of a light receiving unit 1C in accordance with this embodiment. As shown in FIG. 15, the light receiving unit 1C of this embodiment includes: the collimator lens 13 that converts the measurement light 3 inputted via the window 12 into parallel light; a semi-transmissive mirror 15 that functions as a beam splitter for dividing the measurement light 3, which has been converted into parallel light, into two beams; a light receiving chip $10C_1$ that receives the transmitted light $3b$ transmitted through the semi-transmissive mirror 15; a light receiving chip $10C_2$ that receives reflected light $3c$ reflected by the semi-transmissive mirror 15; a Peltier device $20C_1$, that controls the temperature of the light receiving chip $10C_1$; and a Peltier device $20C_2$ that controls the temperature of the light receiving chip $10C_2$, all of which are housed in a housing 2C. The window 12 is made of quartz glass, for example. One surface of the window 12 faces the outside of the housing 2C, while the other surface on the opposite side faces the inside of the housing 2C.

The inside of the housing 2C should be evacuated or filled with inert gas or nitrogen gas, so as to prevent condensation on the light receiving faces of the light receiving chips $10C_1$ and $10C_2$ and deterioration of the detection characteristics. The female optical connector 50 to be engaged with the male optical connector 60 provided at one end of the optical cable 61 is provided on the outside of the window 12 of the housing 2C. The other end of the optical cable 61 is connected to a light source.

The measurement light 3 outputted from the light source is transmitted through the optical cable 61, and enters the housing 2C through the window 12 via the male optical connector 60 and the female optical connector 50. The measurement light 3, which has entered the housing 2C, is converted into parallel light by the collimator lens 13, and then reaches the semi-transmissive mirror 15. The semi-transmissive mirror 15 has a transmittance of 50% and a reflectance of 50%, for example. However, the transmittance and reflectance of the semi-transmissive mirror 15 are not limited to 50%, and may take any value as long as the semi-transmissive mirror 15 can transmit and reflect a sufficient quantity of light.

The transmitted light $3b$ transmitted through the semi-transmissive mirror 15 then reaches the light receiving chip $10C_1$. Based on the light quantity of the incident transmitted light $3b$, the light receiving chip $10C_1$ generates a current (the photoelectric conversion current $I_1$). The generated photoelectric conversion current $I_1$, is outputted to the current monitor power source unit 70 (shown in FIG. 9) via a light-receiving-chip current detection connector $21C_1$.

Meanwhile, the reflected light $3c$ reflected by the semi-transmissive mirror 15 then reaches the light receiving chip $10C_2$. Based on the light quantity of the incident reflected light $3c$, the light receiving chip $10C_2$ generates a current (the photoelectric conversion current $I_2$). The generated photoelectric conversion current $I_2$ is outputted to the current monitor power source unit 70 (shown in FIG. 9) via a light-receiving-chip current detection connector $21C_2$.

In this embodiment, the light receiving chips $10C_1$ and $10C_2$ are light receiving chips with the same sensitivity characteristics. However, even if the light receiving chips have different sensitivity characteristics, the same structure as the above can be employed. The light receiving chips $10C_1$ and $10C_2$ are controlled by the temperature controlling unit 80 (shown in FIG. 9) connected via Peltier device control terminals $11C_1$ and $11C_2$. Here, the light receiving chip $10C_1$ is a low-temperature light receiving chip that has the peak wavelength of the sensitivity curve located on the shorter wavelength side of the desired wavelength region, while the light receiving chip $10C_2$ is a high-temperature light receiving chip that has the peak wavelength of the sensitivity curve located on the longer wavelength side of the desired wavelength region. In this condition, the temperature controlling unit 80 controls the Peltier device $20C_1$ so as to keep the light receiving chip $10C_1$ on the lower temperature side, while controlling the Peltier device $20C_2$ so as to keep the light receiving chip $10C_2$ on the higher temperature side.

As described above, in this embodiment, the beam splitter for splitting the measurement light 3 into two beams is employed, and the two light receiving chips $10C_1$ and $10C_2$ receive the two beams, respectively. Based on the photoelectric conversion current value ratio obtained from the light receiving chips $10C_1$ and $10C_2$, the wavelength of the measurement light 3 is determined.

In this manner, the two light receiving chips (the light receiving chips $10C_1$ and $10C_2$) are controlled by the separate temperature controllers (the Peltier devices $20C_1$ and $20C_2$) so as to have different temperatures (the lower temperature side and the higher temperature side). Accordingly, the peak wavelength of the sensitivity curve of each of the light receiving chips $10C_1$ and $10C_2$ can be adjusted to a desired wavelength. Thus, such a wavelength determinable range as to include the desired wavelength region can be set (see FIG. 8). The other aspects of this embodiment are the same as the first embodiment, and therefore, explanation of them is omitted herein.

Fourth Embodiment

Next, a fourth embodiment of the present invention is described, with reference to the accompanying drawing. In the first embodiment described above, light receiving chips are arranged in multi-stages, and the first-stage light receiving chip is semi-transmissive so that the multi-stage light receiving chips can simultaneously receive the measurement light. In this embodiment, however, two or more light receiving chips are slidably arranged so as to receive the measurement light. In the following case, two sets of light receiving chips and temperature controllers are employed. Also, in the following description, the same components as those in the first embodiment are denoted by the same reference numerals as in the first embodiment, and explanation of them is omitted.

Figure 16:
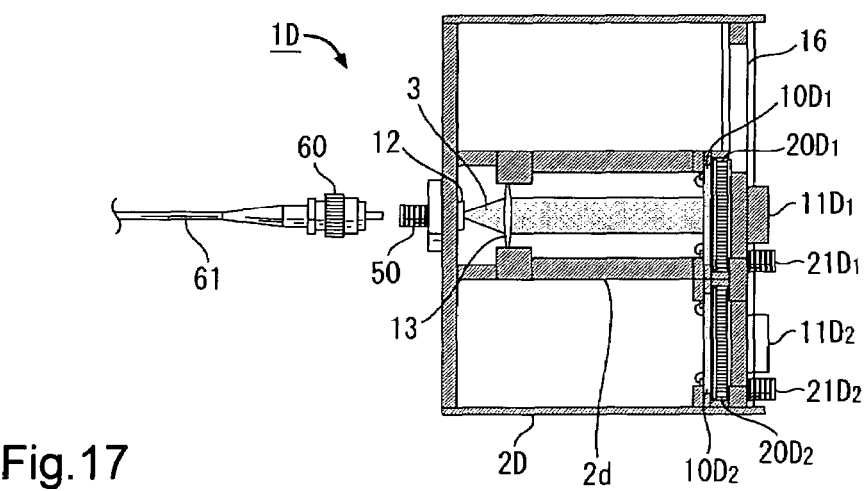
FIG. 16 is an inner perspective view illustrating the structure of a light receiving unit in accordance with a fourth embodiment of the present invention.

FIG. 16 is an inner perspective view illustrating the structure of a light receiving unit 1D in accordance with this embodiment. As shown in FIG. 16, the light receiving unit 1D of this embodiment includes: the collimator lens 13 that converts the measurement light 3 inputted via the window 12 into parallel light; light receiving chips $10D_1$ and $10D_2$ that receive the measurement light 3, which has been converted into parallel light; a Peltier device $20D_1$ that controls the temperature of the light receiving chip $10D_1$; and a Peltier device $20D_2$ that controls the temperature of the light receiving chip $10D_2$; and a sliding mechanism 16 that slides the light receiving chips $10D_1$ and $10D_2$, and the Peltier devices $20D_1$ and $20D_2$, all of which are housed in a housing 2D. The window 12 is made of quartz glass, for example. One surface of the window 12 faces the outside of the housing 2D, while the other surface on the opposite side faces the inside of the housing 2D.

In the above described case, the light receiving chips $10D_1$ and $10D_2$, and the Peltier devices $20D_1$ and $20D_2$, are slid. However, it is possible to slide the collimator lens 13, the window 12, the female optical connector 50, and the male optical connector 60 connected to the female optical connector 50, instead of the light receiving chips $10D_1$ and $10D_2$, and the Peltier devices $20D_1$ and $20D_2$. More specifically, the components for receiving the measurement light 3 are slid, while the light path (or the light axis) of the measurement light 3 is fixed in the above described case. Instead, the light path (or the light axis) of the measurement light 3 can be slid, while the components for receiving the measurement light 3 are fixed. With such a structure, the same objects and effects can be achieved as with the structure in which the light receiving components are slid while the light path (or the light axis) of the measurement light 3 is fixed.

The inside of the housing 2D should be evacuated or filled with inert gas or nitrogen gas, so as to prevent condensation on the light receiving faces of the light receiving chips $10D_1$ and $10D_2$ and deterioration of the detection characteristics. In this embodiment, however, the housing 2D has a double structure so as to maintain the airtightness of at least the light receiving face of the light receiving chip $10D_1$ or $10D_2$ that is measuring the measurement light 3. This is done because the light receiving chips $10D_1$, and $10D_2$, and the Peltier devices $20D_1$, and $20D_2$, are slid in this embodiment. More specifically, an inner wall 2d is employed in the housing 2D, so that the airtightness of the light receiving face of the light receiving chip $10D_1$ or $10D_2$ that is measuring the measurement light 3 can be maintained.

The female optical connector 50 to be engaged with the male optical connector 60 provided at one end of the optical cable 61 is provided on the outside of the window 12 of the housing 2D. The other end of the optical cable 61 is connected to a light source.

The measurement light 3 outputted from the light source is transmitted through the optical cable 61, and enters the housing 2D through the window 12 via the male optical connector 60 and the female optical connector 50. The measurement light 3, which has entered the housing 2D, is converted into parallel light by the collimator lens 13, and then reaches the light receiving face of the light receiving chip $10D_1$. In the present invention, the measurement light 3 is invariably measured first with the light receiving chip $10D_1$.

Based on the incident measurement light 3, the light receiving chip $10D_1$ generates a current (the photoelectric conversion current $I_1$,). The generated photoelectric conversion current $I_1$, is outputted to the current monitor power source unit 70 (shown in FIG. 9) via a light-receiving-chip current detection connector $21D_1$.

Next, the light receiving chips $10D_1$ and $10D_2$, and the Peltier devices $20D_1$, and $20D_2$, are slid by the sliding mechanism 16 to such a position that the measurement light 3 is incident on the light receiving face of the light receiving chip $10D_2$. Based on the light quantity of the incident measurement light 3, the light receiving chip $10D_2$ generates a current (the photoelectric conversion current $I_2$). The generated photoelectric conversion current $I_2$ is outputted to the current monitor power source unit 70 (shown in FIG. 9) via a light-receiving-chip current detection connector $21D_2$.

In this embodiment, the light receiving chips $10D_1$ and $10D_2$ are light receiving chips with the same sensitivity characteristics. However, even if the light receiving chips have different sensitivity characteristics, the same structure as the above can be employed. The light receiving chips $10D_1$ and $10D_2$ are controlled by the temperature controlling unit 80 (shown in FIG. 9) connected via Peltier device control terminals $11D_1$ and $11D_2$. Here, the light receiving chip $10D_1$ is a low-temperature light receiving chip that has the peak wavelength of the sensitivity curve located on the shorter wavelength side of the desired wavelength region, while the light receiving chip $10D_2$ is a high-temperature light receiving chip that has the peak wavelength of the sensitivity curve located on the longer wavelength side of the desired wavelength region. In this condition, the temperature controlling unit 80 controls the Peltier device $20D_1$ so as to keep the light receiving chip $10D_1$ on the lower temperature side, while controlling the Peltier device $20D_2$ so as to keep the light receiving chip $10D_2$ on the higher temperature side.

As described above, in this embodiment, the sliding mechanism 16 that is a moving mechanism for movably holding the light receiving chips $10D_1$ and $10D_2$ controlled at different temperatures, is employed to move the light receiving chips $10D_1$ and $10D_2$ alternately to the incident point of the measurement light 3. Based on the photoelectric conversion current value ratio obtained from the light receiving chips $10D_1$ and $10D_2$, the wavelength of the measurement light 3 is determined.

In this manner, the two light receiving chips (the light receiving chips $10D_1$ and $10D_2$) are controlled by the separate temperature controllers (the Peltier devices $20D_1$ and $20D_2$) so as to have different temperatures (the lower temperature side and the higher temperature side). Accordingly, the peak wavelength of the sensitivity curve of each of the light receiving chips $10D_1$ and $10D_2$ can be adjusted to a desired wavelength. Thus, such a wavelength determinable range as to include the desired wavelength region can be set (see FIG. 8). The other aspects of this embodiment are the same as the first embodiment, and therefore, explanation of them is omitted herein.

Fifth Embodiment

Next, a fifth embodiment of the present invention is described, with reference to the accompanying drawing. In each of the foregoing embodiments, two or more light receiving chips are controlled to have different temperatures, and receive the measurement light. In this embodiment, however, only one light receiving chip is employed. The temperature of this light receiving chip is varied so that different types of sensitivity characteristics can be obtained in time-series order. Based on the sensitivity characteristics, the single light receiving chip receives the measurement light. In the following description, the same components as those in the first embodiment are denoted by the same reference numerals as in the first embodiment, and explanation of them is omitted.

Figure 17:
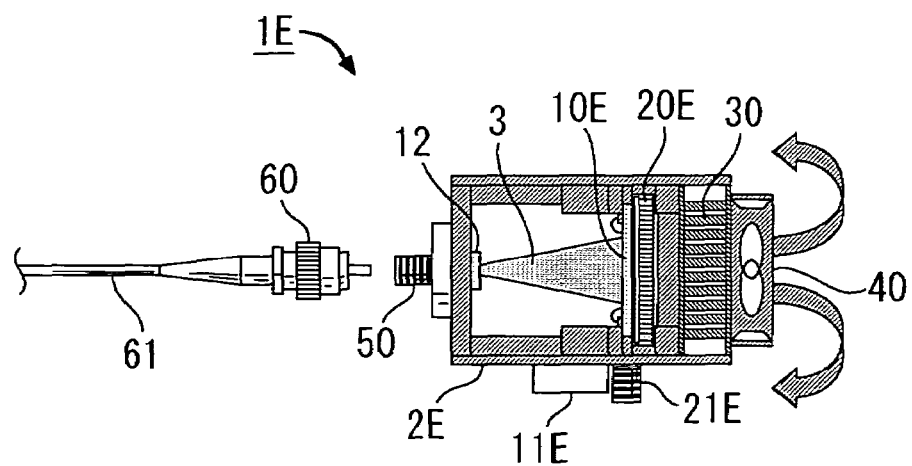
FIG. 17 is an inner perspective view illustrating the structure of a light receiving unit in accordance with a fifth embodiment of the present invention.

FIG. 17 is an inner perspective view illustrating the structure of a light receiving unit 1E in accordance with this embodiment. As shown in FIG. 17, the light receiving unit 1E of this embodiment includes: a light receiving chip 10E that receives the measurement light 3 inputted through the window 12; a Peltier device 20E that controls the temperature of the light receiving chip 10E; the radiator fin 30; and the air cooling fan 40, all of which are housed in a housing 2E. The window 12 is made of quartz glass, for example. One surface of the window 12 faces the outside of the housing 2E, while the other surface on the opposite side faces the inside of the housing 2E.

The inside of the housing 2E should be evacuated or filled with inert gas or nitrogen gas, so as to prevent condensation on the light receiving face of the light receiving chip 10E and deterioration of the detection characteristics. The female optical connector 50 to be engaged with the male optical connector 60 provided at one end of the optical cable 61 is provided on the outside of the window 12 of the housing 2E. The other end of the optical cable 61 is connected to a light source.

The measurement light 3 outputted from the light source is transmitted through the optical cable 61, and enters the housing 2E through the window 12 via the male optical connector 60 and the female optical connector 50. The measurement light 3, which has entered the housing 2E, then reaches the light receiving face of the light receiving chip 10E. At this point, the temperature controller that includes the Peltier device 20E, the radiator fin 30, the air cooling fan 40, and the temperature controlling unit 80 (shown in FIG. 9), first adjusts the light receiving chip 10E to a temperature on the lower temperature side (or the higher temperature side). Based on the incident measurement light 3, the light receiving chip 10E generates a current (the photoelectric conversion current $I_1$). The generated photoelectric conversion current $I_1$ is outputted to the current monitor power source unit 70 (shown in FIG. 9) via a light-receiving-chip current detection connector 21E.

Next, the temperature controller that includes the Peltier device 20E, the radiator fin 30, the air cooling fan 40, and the temperature controlling unit 80 (shown in FIG. 9), adjusts the light receiving chip 10E to a temperature on the higher temperature side (or the lower temperature side). Based on the incident measurement light 3, the light receiving chip 10E generates a current (the photoelectric conversion current $I_2$). The generated photoelectric conversion current $I_2$ is outputted to the current monitor power source unit 70 (shown in FIG. 9) via the light-receiving-chip current detection connector 21E.

As described above, in this embodiment, the temperature of the light receiving chip 10E is sequentially maintained at different temperatures, i.e., first at the lower temperature side (or the higher temperature side) then at the higher temperature side (or the lower temperature side), by the temperature controller. Based on the photoelectric conversion current value ratio obtained with time under the temperature control, the wavelength of the measurement light 3 is determined.

In this manner, the temperature of the single light receiving chip 10E is controlled to vary. Accordingly, the peak wavelength of the sensitivity curve of each of the light receiving chips 10E at each temperature can be adjusted to a desired wavelength. Thus, such a wavelength determinable range as to include the desired wavelength region can be set (see FIG. 8). The other aspects of this embodiment are the same as the first embodiment, and therefore, explanation of them is omitted herein.

Finally, the present invention will be summarized below.

According to an aspect of the present invention, the wavelength measuring device includes: a plurality of light receiving elements (chips) that receive light to be measured; a temperature controller that maintains the light receiving elements at different temperatures from one another; and a calculation unit that obtains the wavelength of the light to be measured, based on outputs of the light receiving elements. With this structure, it is possible to arbitrarily adjust the sensitivity characteristics of the light receiving elements and arbitrarily adjust the respective ranges in which the wavelength can be precisely determined. This makes it possible to easily determine the wavelength in the desired wavelength range with high precision.

The wavelength measuring device may be configured so that the light receiving elements exhibit different light receiving sensitivity characteristics from one another at the same temperature. The temperature control of the light receiving elements makes it possible to arbitrarily adjust the sensitivity characteristics of the light receiving elements. This allows the light receiving elements used to have different sensitivity characteristics at the same temperature.

The wavelength measuring device may be configured so that the light receiving elements exhibit substantially the same light receiving sensitivity characteristics as one another at the same temperature. The temperature control of the light receiving elements makes it possible to arbitrarily adjust the sensitivity characteristics of the light receiving elements. This allows the light receiving elements used to have substantially the same sensitivity characteristics at the same temperature.

According to another aspect of the present invention, a wavelength measuring device includes: a light receiving element that receives light to be measured; a temperature controller that maintains the light receiving element at temperatures that vary with time; and a calculation unit that obtains the wavelength of the light to be measured, based on outputs of the light receiving element obtained with time. The temperature control of the light receiving element makes it possible to arbitrarily adjust the sensitivity characteristic thereof. The temperature may be varied with time, so that the time-series outputs of the element based on different sensitivity characteristics that may be defined in time series can be obtained. It is thus possible to identify the wavelength in the desired wavelength range with high precision.

The wavelength measuring device may be configured so that the temperature controller can vary the temperatures at which the light receiving elements are maintained. With this structure, large temperature differences can be defined, so that a wide dynamic range of wavelength measurement can be obtained.

The wavelength measuring device may be configured so that the temperature controller includes a Peltier device. The Peltier device enables highly precise temperature control. This makes it possible to stably obtain the output of the light receiving element and identify the wavelength with high precision.

The wavelength measuring device may be configured so that the calculation unit obtains the wavelength of the light to be measured, based on an output ratio obtained from the light receiving elements. This enables highly precise wavelength determination.

According to another aspect of the present invention, the light receiving unit includes: a plurality of light receiving elements that receive light to be measured; and a temperature controller that applies different temperatures to the respective light receiving elements, the light receiving elements outputting detection outputs with respect to the light to be measured. With this structure, it is possible to arbitrarily adjust the sensitivity characteristics of the light receiving elements and arbitrarily adjust the respective ranges in which the wavelength can be precisely obtained. This makes it possible to easily determine the wavelength in the desired wavelength range with high precision.

The light receiving unit may be configured so that the light receiving elements exhibit different light receiving sensitivity characteristics from one another at the same temperature. The temperature control of the light receiving elements makes it possible to arbitrarily adjust the sensitivity characteristics of the light receiving elements. This allows the light receiving elements used to have different sensitivity characteristics at the same temperature.

The light receiving unit may be configured so that the light receiving elements exhibit substantially the same light receiving sensitivity characteristics as one another at the same temperature. The temperature control of the light receiving elements makes it possible to arbitrarily adjust the sensitivity characteristics of the light receiving elements. This allows the light receiving elements used to have substantially the same sensitivity characteristics at the same temperature.

The light receiving unit may be configured so that: the light receiving elements are arranged in series in the incident direction of the light to be measured; and a later-stage one of the light receiving elements receives the light to be measured transmitted through an earlier-stage one of the light receiving elements.

The light receiving unit may be configured so that it further includes a beam splitter that splits the light to be measured into separate beams, wherein the light receiving elements receives the respective separate beams.

The light receiving unit may be configured so that it further includes a moving mechanism that movably holds the light receiving elements, wherein the moving mechanism moves one of the light receiving elements to the incident position of the light to be measured.

The light receiving unit may be configured so that it further includes a rotation mechanism that rotatably holds the light receiving elements, wherein the rotation mechanism rotates the light receiving elements so as to move one of the light receiving elements to the incident position of the light to be measured.

According to yet another aspect of the present invention, the light receiving unit includes: a light receiving element that receives light to be measured; and a temperature controller that applies a temperature to the light receiving element, the temperature varying with time, the light receiving element outputting detection outputs with respect to the light to be measured, the detection outputs being obtained with time. With this structure, it is possible to arbitrarily adjust the sensitivity characteristics of the light receiving elements and arbitrarily adjust the respective ranges in which the wavelength can be precisely obtained. This makes it possible to easily determine the wavelength in the desired wavelength range with high precision.

The light receiving unit may be configured so that the temperature controller includes a Peltier device. The Peltier device enables highly precise temperature control. This makes it possible to stably obtain the output of the light receiving chip and determine the wavelength with high precision.

According to a further aspect of the present invention, a wavelength measuring method includes the steps of: obtaining the wavelength of light to be measured, based on outputs from a plurality of light receiving elements that receive the light to be measured; and applying different temperatures to the respective light receiving elements. With this structure, it is possible to arbitrarily adjust the sensitivity characteristics of the light receiving elements and arbitrarily adjust the respective ranges in which the wavelength can be precisely obtained. This makes it possible to easily obtain the wavelength in the desired wavelength range with high precision.

The wavelength measuring method may be configured so that the wavelength of the light to be measured is determined based on an output ratio obtained from the light receiving elements. This enables highly precise wavelength determination.

According to a still further aspect of the present invention, the wavelength measuring method includes the steps of: applying a first temperature to a light receiving element; obtaining an output from the light receiving element that has received light to be measured and to which the first temperature has been applied; applying a second temperature to the light receiving element; obtaining an output from the light receiving element that has received the light to be measured and to which the second temperature has been applied; and obtaining the wavelength of the light to be measured, based on the outputs obtained from the light receiving element. The light receiving element may be controlled to the first and second temperatures, so that the sensitivity characteristic can be arbitrarily adjusted. The controlled temperature may be changed with time, so that the time-series outputs of the light receiving element based on the different sensitivity characteristics can be obtained. This makes it possible to arbitrarily adjust the wavelength range in which the wavelength can be precisely determined and to easily determine the wavelength in the desired wavelength range with high precision.

The wavelength measuring method may be configured so that the wavelength of the light to be measured is obtained based on an output ratio with respect to the outputs obtained from the light receiving element. This enables highly precise wavelength determination.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A wavelength measuring device comprising:
   a single light receiving element that receives light to be measured and generates only a single current at a time as an output based on the received light;
   a temperature controller that maintains only the single light receiving element at different temperatures at which respective sensitivity curves have peaks at different wavelengths that are included in a desired wavelength region; and
   a calculation unit that obtains the wavelength of the light to be measured, based on a sensitivity ratio of the outputs of the single light receiving element obtained with time within the desired wavelength range.

2. The wavelength measuring device as claimed in claim 1, wherein the temperature controller can vary the temperatures at which the light receiving elements is maintained.

3. The wavelength measuring device as claimed in claim 1, wherein the temperature controller includes a Peltier device.

4. The wavelength measuring device as claimed in claim 1, wherein the calculation unit obtains the wavelength of the light to be measured, based on an output ratio obtained from the light receiving elements.

5. A wavelength measuring method comprising the steps of:
   applying a first temperature to a single light receiving element;
   obtaining an output from only a single current generated by the single light receiving element that has received light to be measured and to which the first temperature has been applied;
   applying a second temperature to only the single light receiving element, sensitivity curves having peaks at the respective, first and second temperatures, the peaks being located at different wavelengths that are included in a desired wavelength region;

obtaining an output from the single light receiving element that has received the light to be measured and to which the second temperature has been applied; and obtaining the wavelength of the light to be measured, based on a sensitivity ratio of the outputs obtained from the single light receiving element within the desired wavelength range.

6. The wavelength measuring method as claimed in claim 5, wherein the wavelength of the light to be measured is obtained based on an output ratio with respect to the outputs obtained from the single light receiving element.

* * * * *